(12) United States Patent
Koch et al.

(10) Patent No.: US 8,098,886 B2
(45) Date of Patent: Jan. 17, 2012

(54) COMPUTATION OF INTRINSIC PERCEPTUAL SALIENCY IN VISUAL ENVIRONMENTS, AND APPLICATIONS

(75) Inventors: Christof Koch, Pasadena, CA (US); Laurent Itti, Redondo Beach, CA (US)

(73) Assignee: California Institute of Technology, Pasadena, CA (US)

( * ) Notice: Subject to any disclaimer, the term of this patent is extended or adjusted under 35 U.S.C. 154(b) by 1040 days.

(21) Appl. No.: 11/430,684

(22) Filed: May 8, 2006

(65) Prior Publication Data

US 2006/0215922 A1 Sep. 28, 2006

Related U.S. Application Data

(63) Continuation of application No. 09/912,225, filed on Jul. 23, 2001, now abandoned.

(60) Provisional application No. 60/274,674, filed on Mar. 8, 2001, provisional application No. 60/288,724, filed on May 4, 2001.

(51) Int. Cl.
*G06K 9/00* (2006.01)

(52) U.S. Cl. ..................................................... 382/103

(58) Field of Classification Search .................. 382/103, 382/159, 190, 195, 199, 235, 248, 282
See application file for complete search history.

(56) References Cited

U.S. PATENT DOCUMENTS

| | | | |
|---|---|---|---|
| 5,210,799 A | 5/1993 | Rao | |
| 5,357,194 A | 10/1994 | Ullman et al. | |
| 5,566,246 A | 10/1996 | Rao | |
| 5,598,355 A | 1/1997 | Derou et al. | |
| 5,801,810 A | 9/1998 | Roenker | |
| 5,929,849 A | 7/1999 | Kikinis | |
| 5,983,218 A | 11/1999 | Syeda-Mahood | |
| 5,984,475 A | 11/1999 | Galiana et al. | |
| 6,045,226 A | 4/2000 | Claessens | |
| 6,320,976 B1 | 11/2001 | Murthy et al. | |
| 6,442,203 B1 | 8/2002 | Demos | |
| 6,670,963 B2 | 12/2003 | Osberger | |
| 2002/0081033 A1 | 6/2002 | Stentiford | |

(Continued)

FOREIGN PATENT DOCUMENTS

CN 101489139 7/2009

(Continued)

OTHER PUBLICATIONS

Adelson et al., "Spatiotemporal energy models for the perception of motion," J. Opt. Soc. Am. A. 2: 284-289 (1985).

(Continued)

*Primary Examiner* — Duy M Dang
(74) *Attorney, Agent, or Firm* — Steinfl & Bruno LLP

(57) ABSTRACT

Detection of image salience in a visual display of an image. The image is analyzed at multiple spatial scales and over multiple feature channels to determine the likely salience of different portions of the image. One application for the system is in an advertising context. The detection may be improved by second order statistics, e.g. mean and the standard deviations of different image portions relative to other portions. Different edges may be considered as being extended edges by looking at the edges over multiple spatial scales. One set of feature channels can be optimized for use in moving images, and can detect motion or flicker. The images can be obtained over multiple spectral ranges the user can be instructed about how to maximize the saliency. This can be applied to automatically evaluate and optimize sales or advertisement displays.

19 Claims, 10 Drawing Sheets

U.S. PATENT DOCUMENTS

| | | |
|---|---|---|
| 2002/0126891 A1 | 9/2002 | Osberger |
| 2002/0154833 A1 | 10/2002 | Koch et al. |
| 2005/0047647 A1* | 3/2005 | Rutishauser et al. ......... 382/159 |
| 2005/0069206 A1 | 3/2005 | Ma et al. |
| 2005/0084136 A1 | 4/2005 | Xie et al. |
| 2005/0163344 A1 | 7/2005 | Kayahara et al. |
| 2009/0092314 A1 | 4/2009 | Varshney et al. |
| 2009/0110269 A1 | 4/2009 | Le Meur et al. |

FOREIGN PATENT DOCUMENTS

| | | |
|---|---|---|
| CN | 101601070 | 12/2009 |
| CN | 101697593 | 4/2010 |
| EP | 2034439 | 3/2009 |
| EP | 2136876 | 12/2009 |
| KR | 20080030604 | 4/2008 |
| KR | 20100013402 | 2/2010 |
| WO | 2007088193 | 8/2007 |
| WO | 2008/043204 | 4/2008 |
| WO | 2008040945 | 4/2008 |
| WO | 2008/109771 | 9/2008 |
| WO | 2010109419 | 9/2010 |

OTHER PUBLICATIONS

Bergen, J.R. and B. Julesz, "Parallel versus serial processing in rapid pattern discrimination," Nature 303: 696-8 (1983).

Braun, J. and B. Julesz, "Withdrawing attention at little or no. cost: detection and discrimination tasks," Perception & Psychophysics 60: 1-23 (1998).

Burt et al., "The Laplacian pyramid as compact image code," IEEE Trans on Comm 31: 532-540 (1983).

Itti, L. and C. Koch, "Target Detection Using Saliency-Based Attention," RTO (Research and Technology Organization) Meeting Proceedings 45, Search and Target Acquisition, Systems and Concepts and Integration Panel, Utrecht, The Netherlands, Jun. 21-23, 1999, pp. 3-1-3-10, (Mar. 2000).

Itti, L. and C. Koch, "A comparison of feature combination strategies for saliency-based visual attention," IS&T/Spie Conference on Human Vision and Electromagnetic Imaging IV, San Jose, CA, Jan. 1999, SPIE vol. 3644: 473-482 (1999).

Itti, L. and C. Koch, "A saliency-based search mechanism for overt and covert shifts of visual attention.,"Vision Research 40:1489-1506, (2000).

Itti, L., Koch, C. and Niebur, E., "A model of saliency-based visual attention for rapid scene analysis," IEEE Trans. Pattern Analysis & Machine Intell. (PAMI) 20(11):1254-1259 (1998).

Itti et al., "Revisiting spatial vision: toward a unifying model," J. Opt. Soc. Am. A. 17(11): 1899-1917 (2000).

Koch, C. and S. Ullman, "Shifts in selective visual attention: towards the underlying neural circuitry ," Human Neurobiology, 4:219-227 (1985).

McClurkin et al., "Lateral geniculate neurons in behaving primates. I. Responses to two-dimensional stimuli," J. Neurophysiol. 66(3): 777-793 (1991).

Posner et al., "Neural systems control of spatial orienting," Phil. Trans. R. Soc. Lond. B. 298: 187-198 (1982).

Rensink, R.A., O'Regan, J.K., and Clark, J.J. "To see or not to see: The need for attention to perceive changes in scenes," Psychological Scienc 8:368-373 (1997).

Riesenhuber, M. and T. Poggio, "Models of object recognition," Nature Neuroscience Supplement 3: 1199-1204 (2000).

Sillito et al., "Visual cortical mechanism detecting focal orientation discontinuities," Nature 378: 492-496 (1995).

Treisman et al., "A feature-integration theory of attention," Cognitive Psychology 12: 97-136 (1980).

Treisman, A., "Features and objects: the fourteenth Bartlett memorial lecture," The Quarterly Journal of Experimental Psychology 40A: 201-37 (1998).

Tsotsos et al. , "Modeling visual-attention via selective tuning," Artificial Intelligence 78: 507-45 (1995).

Andersen, R.A. (1997). Multimodal integration for the representation of space in the posterior parietal cortex. Philosophical Transactions of the Royal Society of London, Series B: Biological Sciences, 352, 1421-1428.

Andersen, R. A., Bracewell, R. M., Barash, S., Gnadt, J. W., & Fogassi, L. (1990). Eye position effects on visual, memory, and saccade-related activity in areas LIP and 7A of macaque. Journal of Neuroscience, 10, 1176-1196.

Beymer, D., & Poggio, T. (1996). Image representations for visual learning. Science, 272, 1905-1909.

Braun, J., & Sagi, D. (1990). Vision outside the focus of attention. Perception and Psychophysics, 48, 45-58.

Braun, J. (1998). Vision and attention: the role of training (letter; comment). Nature (Comment on: Nature Jun. 19; 387(6635), 805-807)), 393, 424-425. (Nature, V393, Jun. 4, 1998).

Cannon, M. W., & Fullenkamp, S. C. (1991). Spatial interactions in apparent contrast: inhibitory effects among grating patterns of different spatial frequencies, spatial positions and orientations. Vision Research, 31, 1985-1998.

Colby, C. L., & Goldberg, M. E. (1999). Space and attention in parietal cortex. Annual Review of Neuroscience, 22,319-349.

Corbetta, M. (1998). Frontoparietal cortical networks for directing attention and the eye to visual locations: identical, independent, or overlapping neural systems? Proceedings of the National Academy of Sciences of the United States of America, 95,831-838.

Crick, F., & Koch, C. (1998). Constraints on cortical and thalamic projections: the no-strong-loops hypothesis. Nature, 391,245-250.

Desimone, R., & Duncan, J. (1995). Neural mechanisms of selective visual attention. Annual Review of Neuroscience, 18,193-222.

DeValois, R. L., Albrecht, D. G., & Thorell, L. G. (1982). Spatial-frequency selectivity of cells in macaque visual cortex. Vision Research, 22,545-559.

Driver, J., Mcleod, P., & Dienes, Z. (1992). Motion coherence and conjunction search-implications for guided search theory. Perception and Psychophysics, 51,79-85.

Engel, S., Zhang, X., & Wandell, B. (1997). Colour tuning in human visual cortex measured with functional magnetic resonance imaging. Nature, 388,68-71.

Gallant, J. L., Connor, C. E., & Essen, D. C. V. (1998). Neural activity in areas V1, V2 and V4 during free viewing of natural scenes compared to controlled viewing. Neuroreport, 9,85-90.

Gilbert, C. D., & Wiesel, T. N. (1983). Clustered intrinsic connections in cat visual cortex. Journal of Neuroscience, 3,1116-1133.

Gilbert, C. D., & Wiesel, T. N. (1989). Columnar specificity of intrinsic horizontal and corticocortical connections in cat visual cortex. Journal of Neuroscience, 9,2432-2442.

Gilbert, C. D., Das, A., Ito, M., Kapadia, M., & Westheimer, G. (1996). Spatial integration and cortical dynamics. Proceedings of the National Academy of Sciences of the United States of America, 93,615-622.

Gottlieb, J. P., Kusunoki, M., & Goldberg, M. E. (1998). The representation of visual salience in monkey parietal cortex. Nature, 391,481-484.

Greenspan, H., Belongie, S., Goodman, R., Perona, P., Rakshit, S., & Anderson, C. H. (1994). Overcomplete steerable pyramid filters and rotation invariance. In Proc. IEEE Computer Vision and Pattern Recognition (CVPR), Seattle, WA (Jun.), 222-228.

Hamker, F. H. (1999). The role of feedback connections in task driven visual search. In D. von Heinke, G. W. Humphreys, & A. Olson, Connectionist Models in Cognitive Neuroscience, Proc. of the 5th neural computation and psychology workshop (NCPW'98). London: Springer-Verlag.

Hikosaka, O., Miyauchi, S., & Shimojo, S. (1996). Orienting a spatial attention—its reflexive, compensatory, and voluntary mechanisms. Brain Research and Cognitive Brain Research, 5,1-9.

Hillstrom, A. P., & Yantis, S. (1994). Visual-motion and attentional capture. Perception and Psychophysics, 55,399-411.

Horiuchi, T., Morris, T., Koch, C. & DeWeerth, S. 1997. Analog VLSI circuits for attention-based, visual tracking. In M. Mozer, M. Jordan, & T. Petsche, Neural information processing systems (NIPS*9) (706-712). Cambridge, MA: MIT Press.

Horowitz, T. S., & Wolfe, J. M. (1998). Visual search has no memory. Nature, 394,575-577.

Knierim, J. J., & van Essen, D. C. (1992). Neuronal responses to static texture patterns in area V1 of the alert macaque monkey. Journal of Neurophysiology, 67,961-980.

Koch, C., & Ullman, S. (1985). Shifts in selective visual attention: towards the underlying neural circuitry. *Human Neurobiology*, 4,219-227.

Kustov, A. A., & Robinson, D. L. (1996). Shared neural control of attentional shifts and eye movements. *Nature*, 384,74-77.

Kwak, H. W., & Egeth, H. (1992). Consequences of allocating attention to locations and to other attributes. *Perception and Psychophysics*, 51,455-464.

Laberge, D., & Buchsbaum, M. S. (1990). Positron emission tomographic measurements of pulvinar activity during an attention task. *Journal of Neuroscience*, 10,613-619.

Lee, D. K., Itti, L., Koch, C., & Braun, J. (1999). Attention activates winner-take-all competition among visual filters. *Nature Neuroscience*, 2,375-381.

Levitt, J. B., & Lund, J. S. (1997). Contrast dependence of contextual effects in primate visual cortex. *Nature*, 387,73-76.

Luschow, A., & Nothdurft, H. C. (1993). Pop-out of orientation but no pop-out of motion at isoluminance. *Vision Research*, 33,91-104.

Malach, R. (1994). Cortical columns as devices for maximizing neuronal diversity. *Trends in Neuroscience*, 17, 101-104.

Malach, R., Amir, Y., Harel, M., & Grinvald, A. (1993). Relationship between intrinsic connections and functional architecture revealed by optical imaging and in vivo targeted biocytin injections in primate striate cortex. *Proceedings of the National Academy of Sciences of the United States of America*, 90, 10469-10473.

Malik, J., & Perona, P. (1990). Preattentive texture discrimination with early vision mechanisms. *Journal of the Optical Society of America A*, 7, 923-932.

Motter, B. C., & Belky, E. J. (1998). The guidance of eye movements during active visual search. *Vision Research*, 38, 1805-1815.

Nakayama, K., & Mackeben, M. (1989). Sustained and transient components of focal visual attention. *Vision Research*, 29, 1631-1647.

Niebur, E., & Koch, C. (1996). Control of selective visual attention: modeling the 'where' pathway. In D. Touretzky, M. Mozer, & M. Hasselmo, *Neural information processing systems* (NIPS 8), (802-808). Cambridge, MA: MIT Press.

Niebur, E., & Koch, C. (1998). Computational architectures for attention. In R. Parasuraman, *The attentive brain* (pp. 163-186). Cambridge, MA: MIT Press.

Niyogi, P., Girosi, F., & Poggio, T. (1998). Incorporating prior information in machine learning by creating virtual examples. *Proceedings of the IEEE*, 86, 2196-2209.

Noton, D., & Stark, L. (1971). Scanpaths in eye movements during pattern perception. *Science*, 171, 308-311.

O'Regan, J. K., Rensink, R. A., & Clark, J. J. (1999). Change-blindness as a result of 'mudsplashes'. *Nature*, 398, 34.

Olshausen, B. A., Anderson, C. H., & Van Essen, D. C. (1993). A neurobiological model of visual attention and invariant pattern recognition based on dynamic routing of information. *Journal of Neuroscience*, 13, 4700-4719.

Poggio, T. (1997). Image representations for visual learning. *Lecture Notes in Computer Science*, 1206, 143. Abstract Only).

Polat, U., & Sagi, D. (1994). The architecture of perceptual spatial interactions. *Vision Research*, 34, 73-78.

Polat, U., & Sagi, D. (1994). Spatial interactions in human vision: from near to far via experience-dependent cascades of connections. *Proceedings of the National Academy of Sciences of the United States of America*, 91, 1206-1209.

Rao, R. P. N., & Ballard, D. H. (1995). An active vision architecture based on iconic representations. *Artificial Intelligence*, 78, 461-505.

Robinson, D. L., & Petersen, S. E. (1992). The pulvinar and visual salience. *Trends in Neuroscience*, 15, 127-132.

Rockland, K. S., & Lund, J. S. (1983). Intrinsic laminar lattice connections in primate visual cortex. *Journal of Comparative Neurology*, 216, 303-318.

Rockland, K. S., Andresen, J., Cowie, R. J., & Robinson, D. L. (1999). Single axon analysis of pulvinocortical connections to several visual areas in the macaque. *Journal of Comparative Neurology*, 406, 221-250.

Saarinen, J., & Julesz, B. (1991). The speed of attentional shifts in the visual field. *Proceedings of the National Academy of Sciences of the United States of America*, 88, 1812-1814.

Sheliga, B. M., Riggio, L., & Rizzolatti, G. (1994). Orienting of attention and eye movements. *Experimantal Brain Research*, 98, 507-522.

Shepherd, M., Findlay, J. M., & Hockey, R. J. (1986). The relationship between eye movements and spatial attention. *Quarterly Journal of Experimental Psychology*, 38, 475-491.

Sillito, A. M., & Jones, H. E. (1996). Context-dependent interactions and visual processing in vl. *Journal of Physiology Paris*, 90, 205-209.

Simoncelli, E. P., Freeman, W. T., Adelson, E. H., & Heeger, D. J. (1992). Shiftable multiscale transforms. *IEEE Transactions on Information Theory*, 38, 587-607.

Tootell, R. B., Hamilton, S. L., Silverman, M. S., & Switkes, E. (1988). Functional anatomy of macaque striate cortex. i. ocular dominance, binocular interactions, and baseline conditions. *Journal of Neuroscience*, 8, 1500-1530.

Treisman, A., & Gormican, S. (1988). Feature analysis in early vision: evidence from search asymmetries. *Psychology Review*, 95, 15-48.

Ts'o, D. Y., Gilbert, C. D., & Wiesel, T. N. (1986). Relationships between horizontal interactions and functional architecture in cat striate cortex as revealed by cross-correlation analysis. *Journal of Neuroscience*, 6, 1160-1170.

Wagenaar, W. A. (1969). Note on the construction of digram-balanced latin squares. *Psychology Bulletin*, 72, 384-386.

Weliky, M., Kandler, K., Fitzpatrick, D., & Katz, L. C. (1995). Patterns of excitation and inhibition evoked by horizontal connections in visual cortex share a common relationship to orientation columns. *Neuron*, 15, 541-552.

Wolfe, J. M. (1994). Visual search in continuous, naturalistic stimuli. *Vision Research*, 34, 1187-1195.

Yuille, A. L., & Grzywacz, N. M. (1989). A mathematical-analysis of the motion coherence theory. *International Journal of Computer Vision*, 3, 155-175.

Zenger, B., & Sagi, D. (1996). Isolating excitatory and inhibitory nonlinear spatial interactions involved in contrast detection. *Vision Research*, 36, 2497-2513.

J.M. Wolfe, "Guided Search 2.0: A Revised Model of Visual Search," *Psychonomic Bull. Rev.*, vol. 1, pp. 202-238 (1994).

P. Reinagel and A.M. Zador, "Natural Scene Statistics at the centre of gaze," *Network: Computation in Neural Systems*, vol. 10, Issue 4, pp. 341-350 (Nov. 1999).

I. Kovacs and B. Julesz, "A Closed Curve Is Much More Than an Incomplete One: Effect of Closure in Figure-Ground Segmentation," *Proc. Nat'l Academy of Sciences*, U.S.A., vol. 90, No. 16, pp. 7,495-7,497 (Aug. 1993).

S. Baluja and D.A. Pomerleau, "Expectation-Based Selective Attention for Visual Monitoring and Control of a Robot Vehicle," *Robotics and Autonomous Systems*, vol. 22, No. 3-4, pp. 329-344 (Dec. 1997).

M.W. Cannon and S.C. Fullenkamp, "A Model for Inhibitory Lateral Interaction Effects in Perceived Contrast," *Vision Res.*, vol. 36, No. 8, pp. 1,115-1,125 (Apr. 1996).

R. Milanese, S. Gil, and T. Pun, "Attentive Mechanisms for Dynamic and Static Scene Analysis," *Optical Eng.*, vol. 34, No. 8, pp. 2,428-2,434 (Aug. 1995).

M.I. Posner and Y. Cohen, "Components of Visual Orienting," H. Bouma and D.G. Bouwhuis, eds., *Attention and Performance*, vol. 10, pp. 531-556. Hilldale, N.J.: Erlbaum (1984).

* cited by examiner

COMPUTATION OF INTRINSIC PERCEPTUAL SALIENCY IN VISUAL ENVIRONMENTS, AND APPLICATIONS

CROSS REFERENCE TO RELATED APPLICATIONS

This application is a continuation (and claims the benefit of priority under 35 USC 120) of U.S. application Ser. No. 09/912,225, filed Jul. 23, 2001, now adandoned which claims benefit of priority of U.S. Provisional Application Ser. No. 60/274,674 filed Mar. 8, 2001, and U.S. Provisional Application Ser. No. 60/288,724 filed May 4, 2001. The disclosure of the prior application is considered part of (and is incorporated by reference in) the disclosure of this application.

STATEMENT AS TO FEDERALLY-SPONSORED RESEARCH

This work was supported by the Engineering Research Centers Program of the National Science Foundation under Award Number EEC-9402726 and by the Office of Naval Research under Award Number N00014-95-1-0600. The US Government may have certain rights in this invention.

BACKGROUND

Different systems for analysis of vision components are known. Many of these systems, broadly categorized under machine vision, attempt to use the machine, usually a digital computer running dedicated software, to actually identify parts of the image.

However, vision algorithms frequently fail when confronted with real life images. These real life images may be of extremely high resolution, e.g., on the order of 6000 by 4000 pixels, and may be very cluttered with information that might not necessarily be relevant to the visual task at hand. For instance, many images may have partially occluding objects such as foliage, vehicles, people and so on.

It is believed that biological vision systems use a different approach. The mammalian visual system is believed to use a computational strategy of identifying interesting parts of the image without extensively analyzing the content of the image. The entire image may be analyzed in parallel for simple features. Portions of the image are then selected, based either on their behavioral relevance or based on local image cues. The local image cues may include brightness, motion, and/or color and others. The mammalian brain evolved in this manner to handle the enormous amount of information that is received from a scene. This information has been estimated as being on the order of up to $10^8$ bits per second along the optic nerve, the axonal fibers that constitute the output of the retina. This may exceed what the brain is capable of fully processing and assimilating into its conscious experience.

Because of this processing strategy, only a small fraction of the information that is actually registered by the human visual system actually influences behavior. Different studies have demonstrated this in different ways. In some studies ("change blindness") (Rensink, R. A., O'Regan, J. K., and Clark, J. J. "To see or not to see: The need for attention to perceive changes in scenes," Psychological Sci. 8:368-373, 1997) significant image changes are not actually perceived under natural viewing conditions. However, once the attention of the person is directed to these changes, they can be easily perceived. This implies that even though a part of an image might be registered by the brain, the conscious mind might not be visually aware of that part or any other in the image.

Those parts of an image which elicit a strong, rapid and automatic response from viewers, independent of the task they are trying to solve, can be referred to as being "visually salient". Two examples of such salient locations are a green object among red ones, or a vertical line among horizontal ones. The mind can direct its attention to other parts of the image, although that may require voluntary effort.

SUMMARY

The present invention describes a computer-based implementation that allows automatic detection of salient parts of image information. This may use a model which is based on the way the primate's visual system is believed to process the retinal image stream.

The application discloses the basic model, and applications of the model to various practical uses. One such use includes detection of the effectiveness of an image or temporal sequence of images in displaying their content, e.g., in advertising context. Some specific model attributes are also disclosed. A first model attribute describes higher order statistical analysis of image information to compute saliency. Another model attribute discloses detection of extended but interrupted contours within the image information that can contribute to image saliency. In another model attribute, the computation of saliency specific to moving objects in a video sequence or constantly changing image sequences is described. Another aspect relates to the improvement of computing saliency for video sequence detection, by detecting portions of the video sequence which flicker. Another relates to the usage of multiple spectral images acquired of the same scene. Another relates to the ability of the model to provide specific feedback on how to improve the saliency of specific objects or locations in the scene.

At the basis of the invention was the original concept of a "saliency map" proposed by Koch and Ullman (Koch, C. and Ullman, S. Shifts in selective visual attention: towards the underlying neural circuitry. *Human Neurobiology*, 4:219-227, 1985), and two detailed computer implementations: Itti, L., Koch, C. and Niebur, E. A model of saliency-based visual attention for rapid scene analysis. *IEEE Trans. Pattern Analysis & Machine Intell. (PAMI)* 20:1254-1259, 1998 and Itti, L. and Koch, C. A saliency-based search mechanism for overt and covert shifts of visual attention. *Vision Research* 40:1489-1506, 2000.

BRIEF DESCRIPTION OF THE DRAWINGS

These and other aspects of the invention will be described in detail with reference to the accompanying drawings, wherein.

DETAILED DESCRIPTION

Figure 1A:
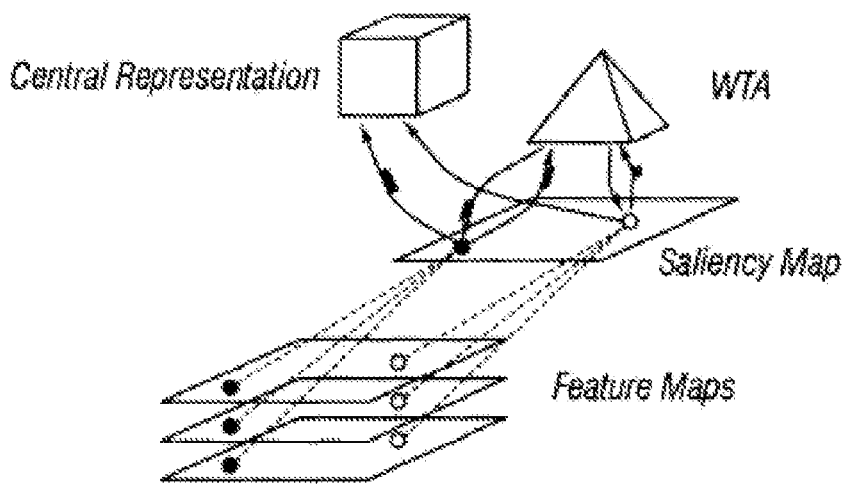
FIGS. 1A and 1B show a flow diagram of a model of saliency-based attention.
Figure 1B:
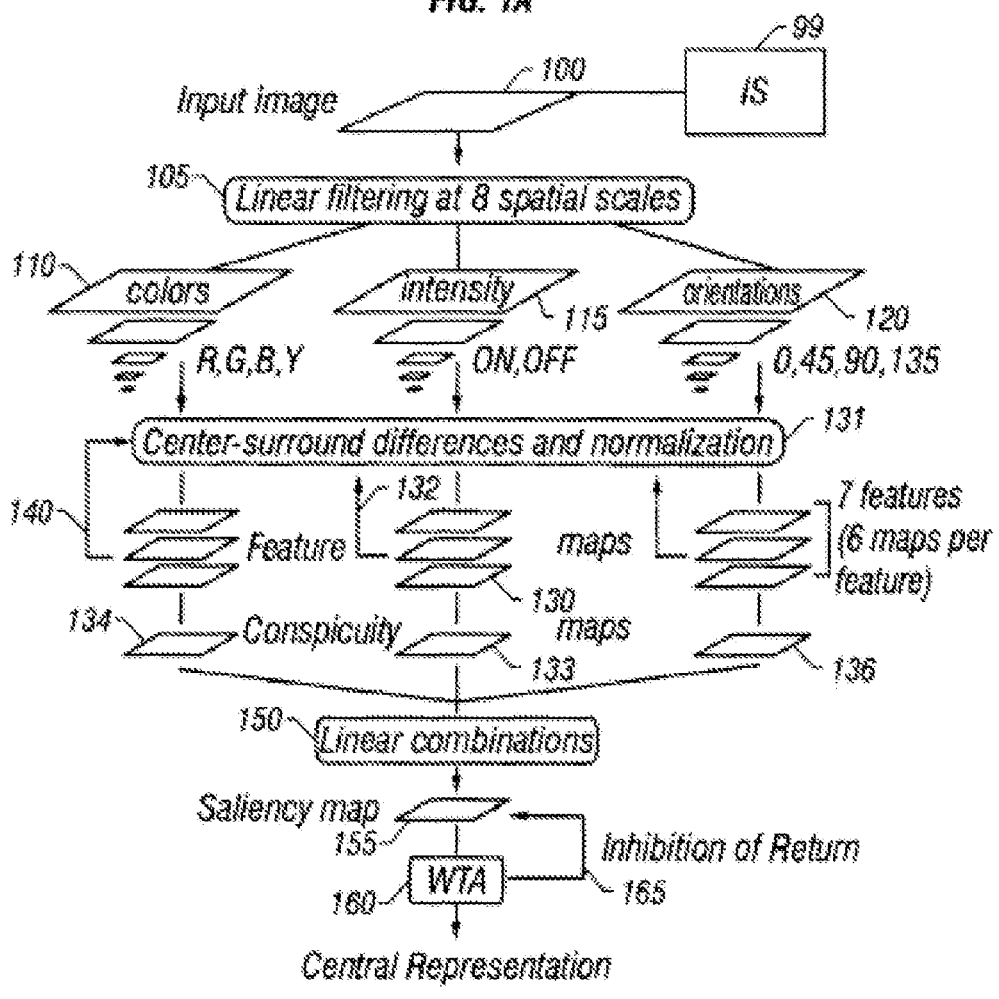

FIGS. 1A and 1B show a system for determining a saliency map, which may be a two-dimensional map that encodes salient objects in a visual environment. The map of the scene expresses the saliency of all locations in this image. This map is the result of competitive interactions among feature maps for image features including color, orientation, texture, motion, depth and so on, that interact within and across each map. At any time, the currently strongest location in the saliency map corresponds to the most salient object. The value in the map represents the local saliency of any one location with respect to its neighborhood. By default, the system directs attention towards the most salient location.

A second most salient location may be found by inhibiting the most salient location, causing the system to automatically shift to the next most salient location.

The techniques described herein are based on the bottom-up control of attention, i.e., control that is based on the properties of the visual stimulus. This compares with a top-down component, which may be based not only on the content of the image but also on additional high-level features that may depend on a specific visual task at hand. An example of a top-down component would include, for example, storing an image of a face of a person one is searching for, followed by correlating that image across the entire scene.

A task of the saliency map is to compute a scalar quantity representing the salience at every location in the visual field, and to guide the subsequent selection of attended locations. The "feature maps" provide the input to the saliency map, which is modeled as a neural network receiving its input at a particular spatial scale (here scale 4).

The input image 100 may be a digitized image from a variety of sources. In one embodiment, the digitized image may be from an NTSC video camera.

At 105, linear filtering is carried out at different spatial scales, here nine spatial scales. The spatial scales may be created using Gaussian pyramid filters of the Burt and Adelson type. These pyramid filters may include progressively low pass filtering and sub-sampling of the input image. The spatial processing pyramids can have an arbitrary number of spatial scales. In the example provided, nine spatial scales provide horizontal and vertical image reduction factors ranging from 1:1 (level 0, representing the original input image) to 1:256 (level 8) in powers of 2. This may be used to detect differences in the image between fine and coarse scales.

Each portion of the image is analyzed by comparing the "center" portion of the image with the surround part of the image. Each comparison, called "center-surround" difference, may be carried out at multiple spatial scales indexed by the scale of the center, c, where, for example, c=2, 3 or 4 in the pyramid schemes. Each one of those is compared to the scale of the surround s=c+d, where, for example, d is 3 or 4. This example would yield 6 feature maps for each feature at the scales 2-5, 2-6, 3-6, 3-7, 4-7 and 4-8 (for instance, in the last case, the image at spatial scale 8 is subtracted, after suitable normalization, from the image at spatial scale 4). One feature type encodes for intensity contrast, e.g., "on" and "off" intensity contrast shown as 115. This may encode for the modulus of image luminance contrast, which shows the absolute value of the difference between center intensity and surround intensity. The differences between two images at different scales may be obtained by oversampling the image at the coarser scale to the resolution of the image at the finer scale. In principle, any number of scales in the pyramids, of center scales, and of surround scales, may be used.

Another feature 110 encodes for colors. With r, g and b respectively representing the red, green and blue channels of the input image, an intensity image I is obtained as I=(r+g+b)/3. A Gaussian pyramid I(s) is created from I, where s is the scale. The r, g and b channels are normalized by I at 131, at the locations where the intensity is at least 10% of its maximum, in order to decorrelate hue from intensity.

Four broadly tuned color channels may be created, for example as: R=r−(g+b)/2 for red, G=g−(r+b)/2 for green, B=b−(r+g)/2 for blue, and Y=(r+g)/2−|r−g|/2−b for yellow, where negative values are set to zero). 131 computes center-surround differences across scales. Two different feature maps may be used for color, a first encoding red-green feature maps, and a second encoding blue-yellow feature maps. Four Gaussian pyramids R(s), G(s), B(s) and Y(s) are created from these color channels. Depending on the input image, many more color channels could be evaluated in this manner.

In one embodiment, the image sensor 99 that obtains the image of a particular scene is a multi-spectral image sensor. This image sensor may obtain different spectra of the same scene. For example, the image sensor may sample a scene in the infra-red as well as in the visible part of the spectrum. These two images may then be evaluated in a similar manner to that described above.

Another feature type may encode for local orientation contrast 120. This may use the creation of oriented Gabor pyramids as known in the art. Four orientation-selective pyramids may thus be created from I using Gabor filtering at 0, 45, 90 and 135 degrees, operating as the four features. The maps encode, as a group, the difference between the average local orientation and the center and surround scales. In a more general implementation, many more than four orientation channels could be used.

In summary, differences between a "center" fine scale c and a "surround" coarser scales yield six feature maps for each of intensity contrast, red-green double opponency, blue-yellow double opponency, and the four orientations. A total of 42 feature maps is thus created, using six pairs of center-surround scales in seven types of features, following the example above. A different number of feature maps may be obtained using a different number of pyramid scales, center scales, surround scales, or features.

131 shows normalizing the features to extract salient image location from the raw center-surround maps, and to discard inconspicuous locations. This process may be critical to the operation of the system. This operation follows the flowchart of FIG. 2. At 200, each feature map is first normalized to a fixed dynamic range such as between 0 and 1. This may eliminate feature-dependent amplitude differences that may be due to different feature extraction mechanisms.

At each step of the iteration, the map is convolved by a large difference-of-Gaussians kernel at 215 and the results are added to the center contents of the map at 210. The additional input implements the short-range excitation processes and the long-range inhibitory processes between the neighboring visual locations. The map is then half-wave rectified at 220, which may remove negative results. This makes the iterative process nonlinear, which may improve the results.

Specifically, the filter carries out $$DOG(x, y) = \frac{c_{ex}^2}{2\pi\sigma_{ex}^2}e^{-(x^2+y^2)/(2\delta_{ex}^2)} - \frac{c_{inh}^2}{2\pi\sigma_{inh}^2}e^{-(x^2+y^2)/(2\delta_{inh}^2)} \quad (1)$$

where $c_{ex}$ and $c_{in}$ are positive numbers that denote the strength of the excitatory center response and the strength of the inhibitory surround response, respectively. $\delta_{ex}$ and $\delta_{inh}$ denote the width, spatial extent or size of the associated excitatory central Gaussian or the inhibitory surround Gaussian. In eq. 1, the central Gaussian is subtracted from the surround Gaussian to obtain a so-called "Mexican-Hat" operator or "Difference-of-Gaussian", hence leading to the name 'DoG'. This can also be seen in the central box '215' of FIG. 2.

At each iteration, the feature map M goes through the following transformation:

$$M \leftarrow |M+M*DOG-C_{inh}|_{\geq 0} \quad (2)$$

Eq. 2 shows getting the new value of the image 'M' by taking the current input image in map 'M', filtering it through this 'DOG' filter, adding it to the existing Map 'M', and subtracting an inhibitory constant $C_{inh}$. Positive results are kept; negative results are set to zero.

Each feature map is iterated 10 times using this equation. Different numbers of iterations may be carried out, based on experience and the application domain. The local excitation is counteracted by broad inhibition from neighboring locations. This spatial interaction across the entire map may be crucial for resolving competition among salient items.

Figure 3:
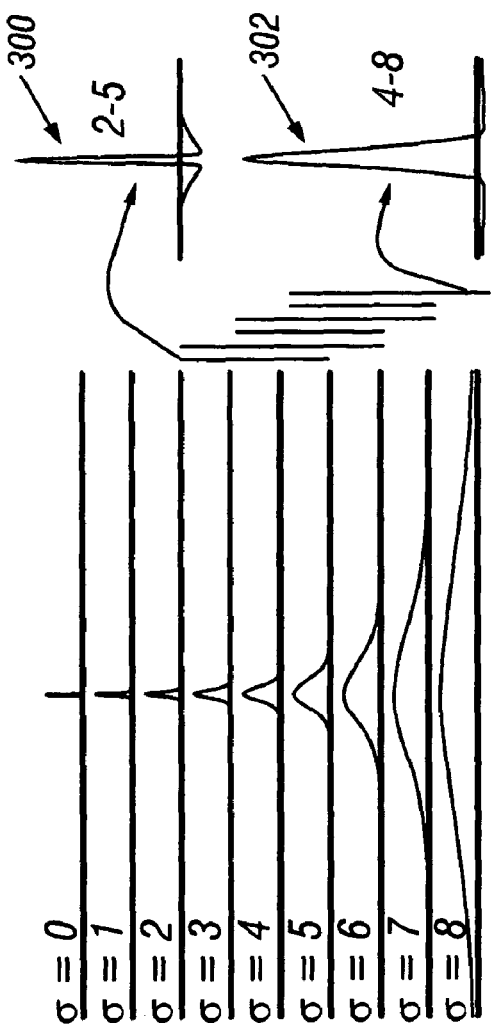
FIG. 3 shows a diagram of waveforms obtained at different spatial resolutions or scales.

FIG. 3 shows two different examples of the six center-surround receptive field types. The left part of the figure shows Gaussian pixel widths, numbered 0-8, for the 9 spatial scales used in the model example of FIG. 1A and FIG. 1B. Scale 0 corresponds to the original image, and each subsequent scale is coarser by a factor 2. At the coarsest scale, sigma=8, almost the entire image is blurred and only very coarse objects are visible as blobs. 300 and 302 show two examples of the six center-surround receptive field types. 300 shows the scale pair 2-5 representing the image filtered with the filter with sigma=2 being subtracted from the image filtered sigma=5. 302 shows the scale pair 4-8. The spatial competition for salience may be implemented within each of the feature maps. Each map receives input from the filtering and center surround stages.

Figure 4:
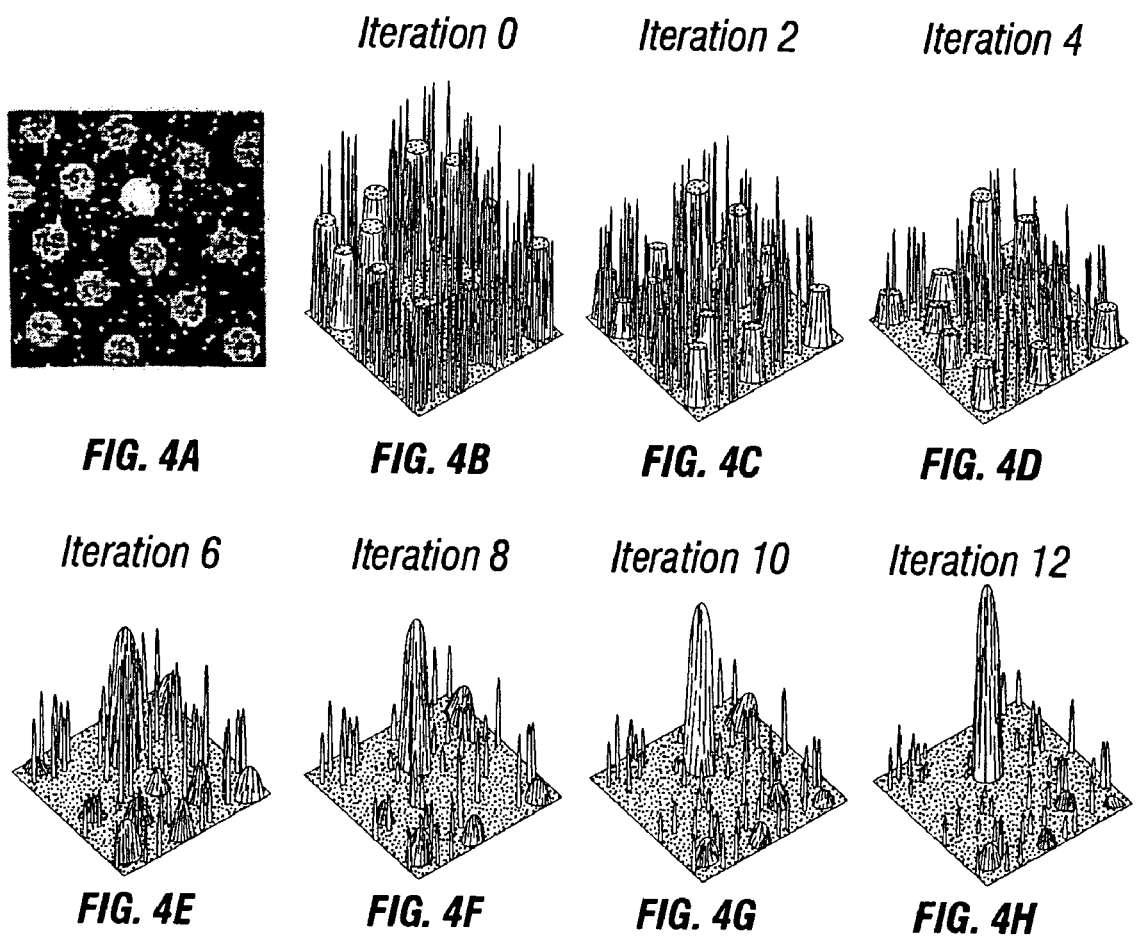
FIG. 4A-4H shows results of different numbers of iterations of the iterative equation to converge to salient elements.

An example of results is shown in FIGS. 4A-4H. FIG. 4A shows the actual image, with iteration 0 (FIG. 4B) showing the items that are present in FIG. 4A. FIG. 4C shows two iterations of the type illustrated in FIG. 2 to show that the salient features begin to emerge. This is shown in further detail in FIGS. 4D (iteration 4), 4E (iterations 6), 4F (iteration 8), 4G (iteration 10) and 4H (iteration 12). FIG. 4G representing iteration 10 clearly shows which features are most salient, and this only becomes more evident in FIG. 4H showing the result of iteration 12. Since there is not that much difference between iterations 10 and 12, in this situation it is evident that the iteration can be stopped at 10. The net effect of the iterative process in this example was to reinforce the brightest object while suppressing the darker objects, which may embody the fact that the brightest object may be perceived as visually salient by human observers.

After normalization at 131, the feature maps for intensity, color, and orientation are summed across scales into three separate "conspicuity maps," 133 for intensity, 134 for color and 136 for orientation. Conspicuity maps for other features, such as motion or flicker, can easily be added here.

Figure 2:
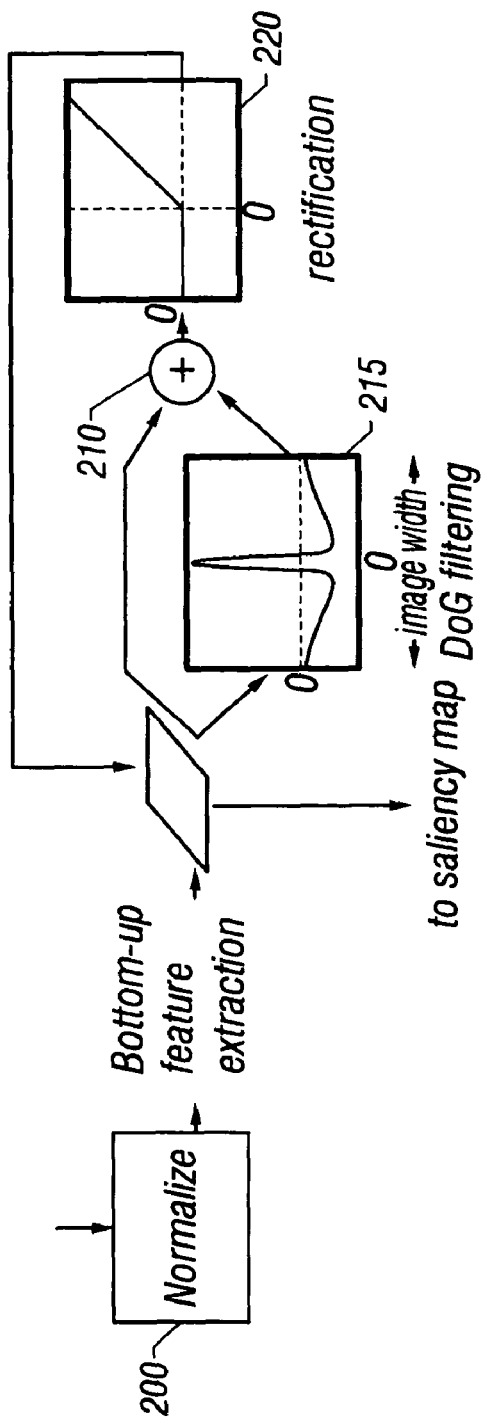
FIG. 2 shows a block diagram of the nonlinear filtering using an iterated difference of Gaussian filter.

Each conspicuity map is then subjected to another 10 iterations of the iterative normalization process shown in FIG. 2. The motivation for the creation of three separate channels and their individual normalization is the hypothesis that similar features compete strongly for salience, while different modalities contribute independently to the saliency map. The individual normalization may provide additional information since similar features may compete strongly for salience, while different modalities may contribute independently to the saliency maps.

This "within-feature competitive" globally promotes the most salient portions of the feature map, both within a feature, and over the whole map.

After this, at 150, linear combinations of these maps are taken to form the unique saliency map shown as 155. At any given time, the maximum of the saliency map may correspond to the most salient stimulus, and represents the item to which the focus of attention should next be directed. Hence, at any given time, the most salient location may be determined from the maximum of the saliency map. This may be effected at 160 using a "winner take all" technique.

Different "winner take all" techniques are known. However, this system may use a two-dimensional layer of integrate and fire neurons with strong global inhibition.

The system as described might direct its focus of attention constantly to one location since the same winner would always be selected. Accordingly, the feedback shown as 165 is indicated to provide feedback from the "winner take all" array 160 to the saliency map 155. That is, after some period of variable delay, the saliency of the winning location may be transiently inhibited. This assures that the "winner take all" circuit automatically selects the next most salient location. As a consequence, attention then switches to the next most conspicuous location. This inhibition prevents a previously attended location from being attended to again within a short interval and endows the entire algorithm with a dynamic element.

The above embodiment has described comparisons between different image parts at 130 which rely on simple center-surround mechanisms. These are implemented as differences between mean pixel values, across the different spatial scales, as described. However, in some situations this might not correctly detect any dissimilarity between the center and surround regions that may be present in the higher-order spatial statistics of the input.

Figure 6:
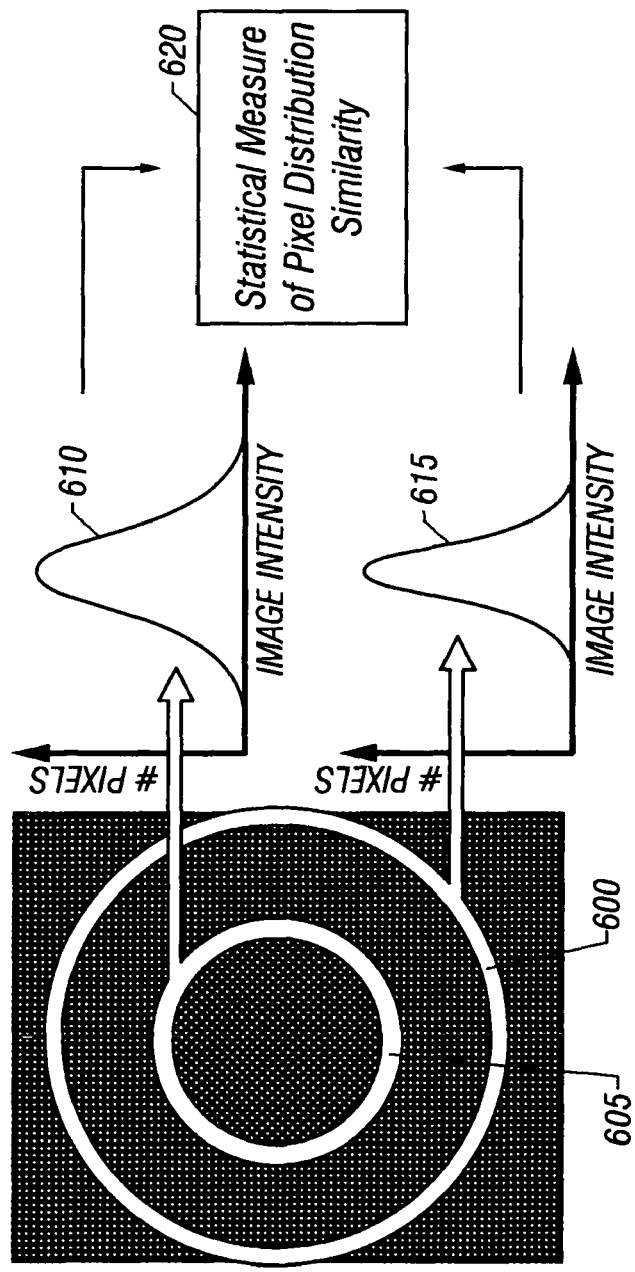
FIG. 6 shows a block diagram of a statistical measure of pixel distribution using higher order statistics.

Another embodiment determines higher order, e.g., second order, statistics in the image. This may be done for any of previously described purposes. For example, consider the case as shown in FIG. 6, where the center and surround are two different textures with similar means but different higher-order statistics (for instance, different variances). A simple comparison of the mean pixel values between the center and surround regions would show a low saliency, while both textures may appear quite dissimilar to human observers.

An alternative embodiment described herein takes into account not only mean value differences between center and surround, but also the statistical distribution of the information.

An embodiment describes the use of second-order statistics, here the variance of pixel distribution. This technique may be used when a simple comparison of mean pixel values between center and surround regions shows a low saliency. Alternatively, this may be used for all applications of the invention.

This system may provide a statistical measure of a difference of distributions of pixel values between the center and surrounding regions.

This embodiment may assume that the pixels should be distributed in a Gaussian format. While this assumption holds for only certain kinds of images, it may still represent a better approximation than the first embodiment. However, more general statistical assumptions could also be used.

Figure 5:
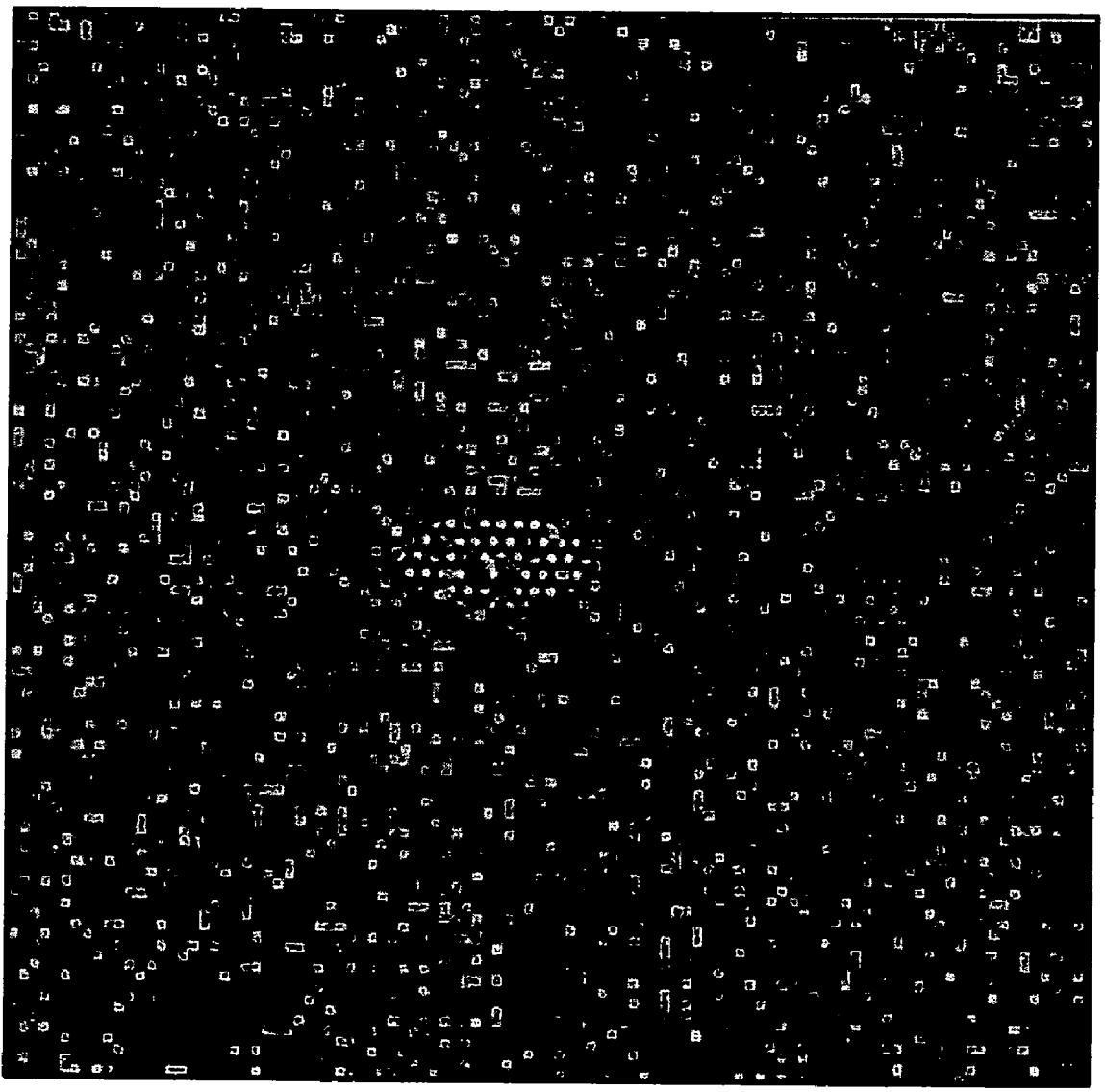
FIG. 5 shows an exemplary field with a background and an internal elliptical area.

An example is shown in FIG. 5. An image is shown having a background area with a texture, and an elliptical area within the other background area. An observer can easily see the elliptical area within the background in FIG. 5, but the average values are more or less the same.

FIG. 6 shows a block diagram of a center-surround neuronal "unit" of this embodiment. This unit is comparing two different parts 600, 605 with different textures. The unit compares the distribution of pixel values between the center 605 and surround regions 600. In the example shown, the mean pixel values are substantially identical over the center and concentric surround regions. Therefore, an operator that only considered the mean intensity in the center and subtracts that from the average intensity in the surround would obtain a value close to zero and would not find the center portion to be salient. Note that the mean of the two Gaussian distributions in the middle plot are identical.

This embodiment takes the variance as shown. The variance of the center region 610 is higher than the variance 615 of the surround. The distributions of pixel values in center and surround are approximated two Gaussian functions. A statistical measure of similarity between those distributions (such as the Kullback divergence) may then be used to compute the response of the neuron at 620, such that identical distributions yield no neuronal response while very different distributions yield a strong response.

Figure 7:
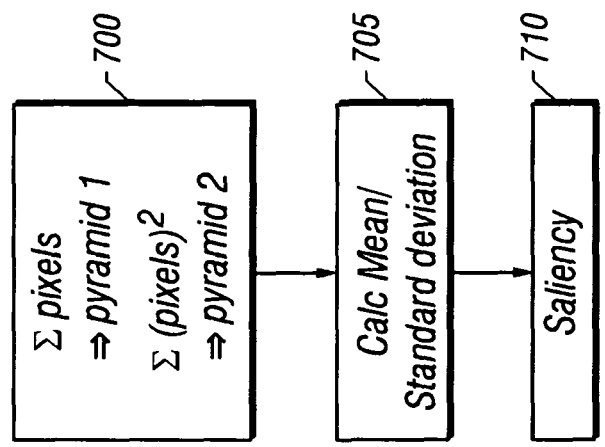
FIG. 7 shows a flowchart of operation of obtaining the different image pyramids.

The mean and standard deviation may be calculated as follows, and as shown in the flowchart of FIG. 7. The pixel distribution is taken in a region represented by a pixel at a given level in a multiscale image pyramid.

At 700, two different image "pyramids", are created, that is two sets of images filtered at different resolutions, of sigmas in FIG. 3. Each pyramid accumulates the sum and the sum of the squares of all the pixels up to the chosen level of the pyramids. That is, at a given level n in the sum pyramid, each pixel is the sum of the pixel values $x_i$ of the $(d_n)^2$ corresponding pixels at the base level of the pyramid, where d is the scaling between levels in the pyramid. In the specific implementation, d=2.

The sum-of-squares pyramid is similar except that an image of the sum of the squares of the pixel values in the original image is used as the base of the pyramid.

This data is already calculated and stored in two pyramids. Therefore the mean and standard deviation for any pixel at level n in the pyramid can be easily calculated as $$\mu = \frac{1}{n}\sum_i x_i$$

$$\sigma^2 = \left(\frac{1}{n-1}\right)\left[\sum_i x_i^2 + \left(\frac{1}{n^2} - \frac{2}{n}\right)\left(\sum_j x_j\right)^2\right]$$

$$n = (d^n)^2 \text{ at 705.}$$

At 710, saliency is then derived from a comparison between this mean and standard deviation for the center and surrounding regions. The saliency may use other similar measures including Euclidean distance between the mean-standard deviation pair, ideal-observer discrimination, and the Kullback J-divergence.

This higher order comparison may not only be applied to the intensity channel, but also to color opponencies and orientation-selective channels or to any other channel.

Figure 8:
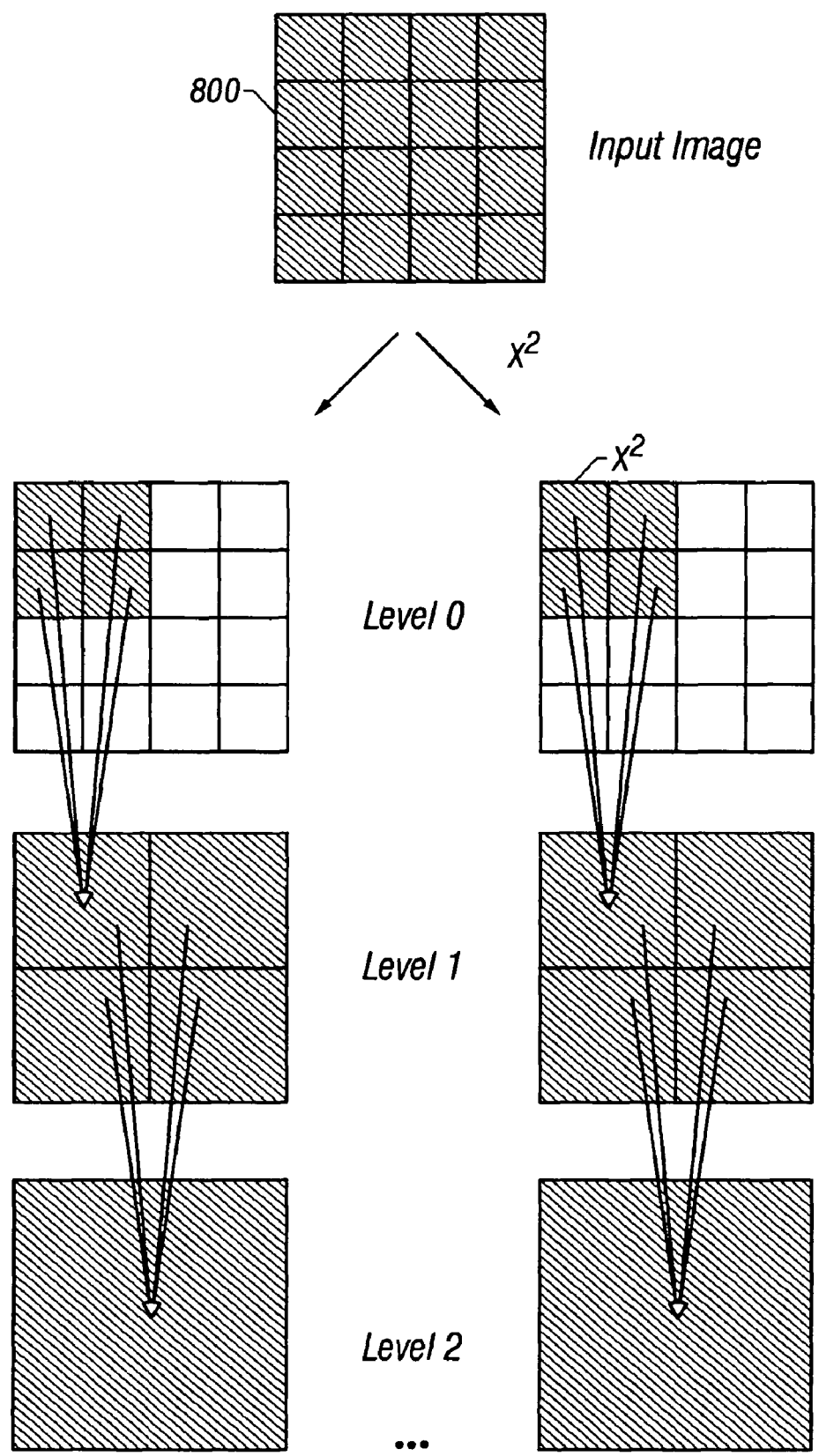
FIG. 8 shows a diagram of the different pyramids obtained.

FIG. 8 graphically illustrates the computation of mean and variance of pixel distribution within increasingly larger square regions, using an image pyramid architecture. From the original input image 800, two dyadic image pyramids are created. In the sum pyramid on the left, each pixel at a given level "n" contains the sum of all corresponding pixels at level 0 (the original image). In the second one (right), each pixel at level "n" contains the sum of squares of all corresponding pixels at level 0.

Figure 9:
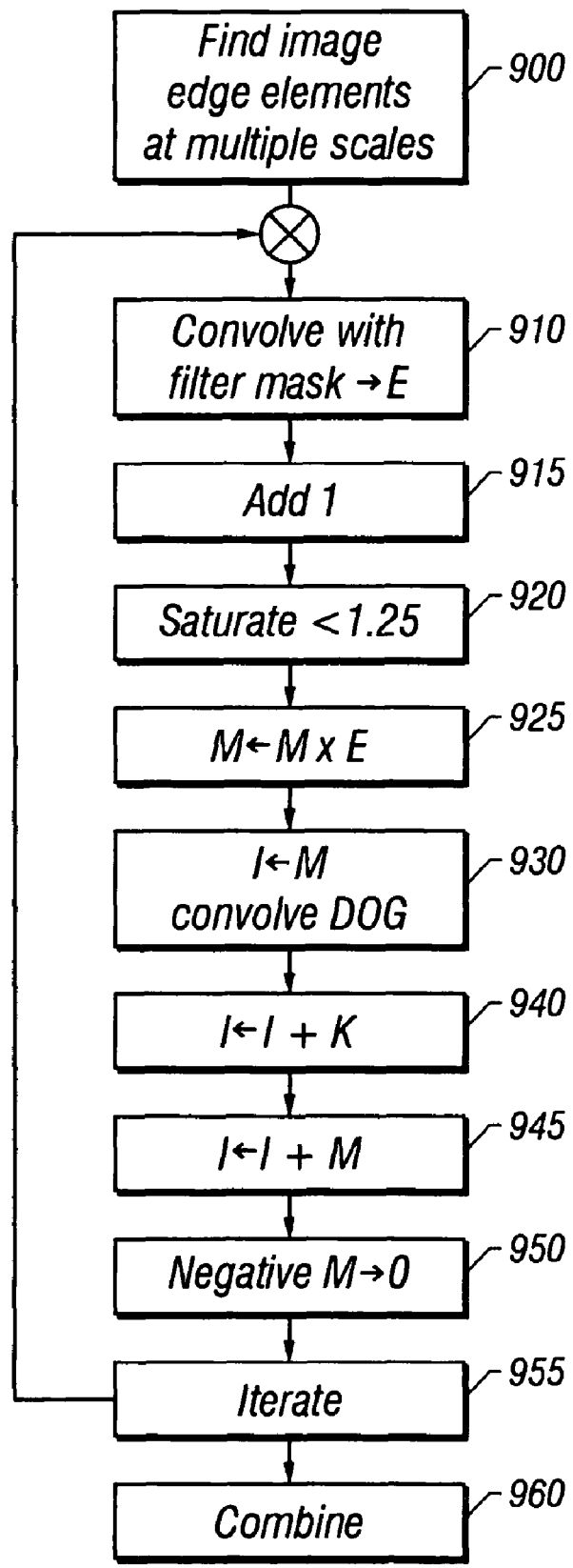
FIG. 9 shows a flowchart of finding extended image contours.

Another improvement may include improved detection of center-surround differences by contour identification. Detection of salient contours involves the elaboration of a subset of elongated contours in the image. Image contour detection can be done with standard image processing techniques, such as by using Canny edge-detection filtering. Several techniques have been proposed for the detection of salient contours. The present technique uses a multiscale approach which is flowcharted in FIG. 9, and shown graphically in FIG. 10A-C.

At 900, contours and edges of the image are detected at multiple spatial scales using oriented Gabor filters which may be set to take account of contours in both local neighborhoods as well as contours across the entire image. This takes note that a longer contour or edge, even if interrupted, may represent a more salient image feature than shorter image segments, even if they are continuous and non-interrupted.

In this embodiment, at any given spatial scale, neighboring locations interact such that edge elements at a given orientation which appear to form a contour reinforce each other. This provides the raw map "M" containing Gabor edge detection results at a given spatial scale, with values scaled between 0 and 1. These values are iterated as follows. At 910, the image is convolved with an excitatory filter mask, yielding a new map "E".

At 915, the value 1 is added to E.

920 saturates values>1.25 to avoid explosion.

The raw map M is multiplied by E at 925.

At 930, M is convolved by a difference of Gaussian filter, yielding I

At 940, a small constant k is added to I which implements a global inhibitory bias, AT 945, I is added to M, At 950, negative values in M are eliminated by setting them to zero.

Note that this is a non-linear process, since saturation is applied at one end, and negative values are eliminated at the other end. At 955, this non-linear process 910-950 is iterated a few times (on the order of 10 iterations), hence implementing a recurrent non-linear scheme with early termination.

Figure 10A:
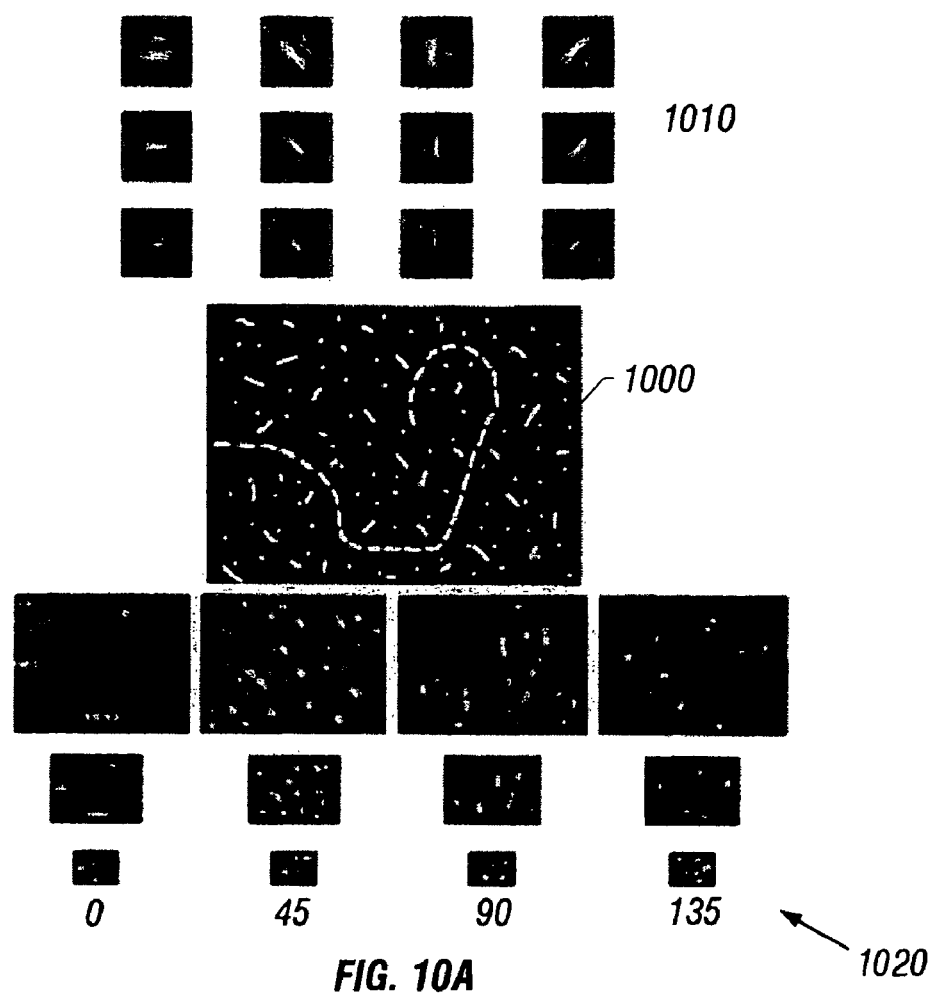
FIGS. 10A-10C show additional information in finding the extended contours.
Figure 10B:
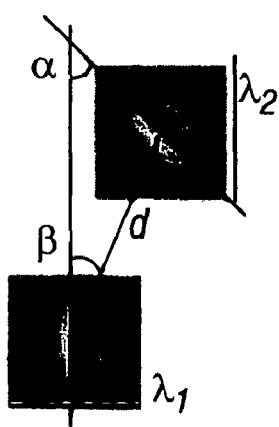
Figure 10C:
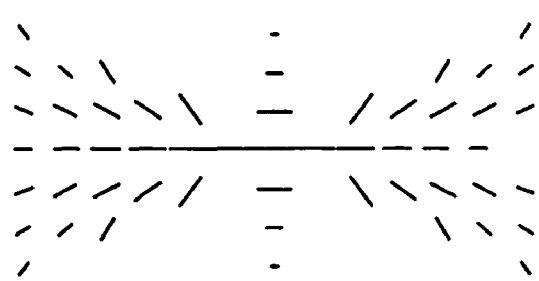
Figure 11:
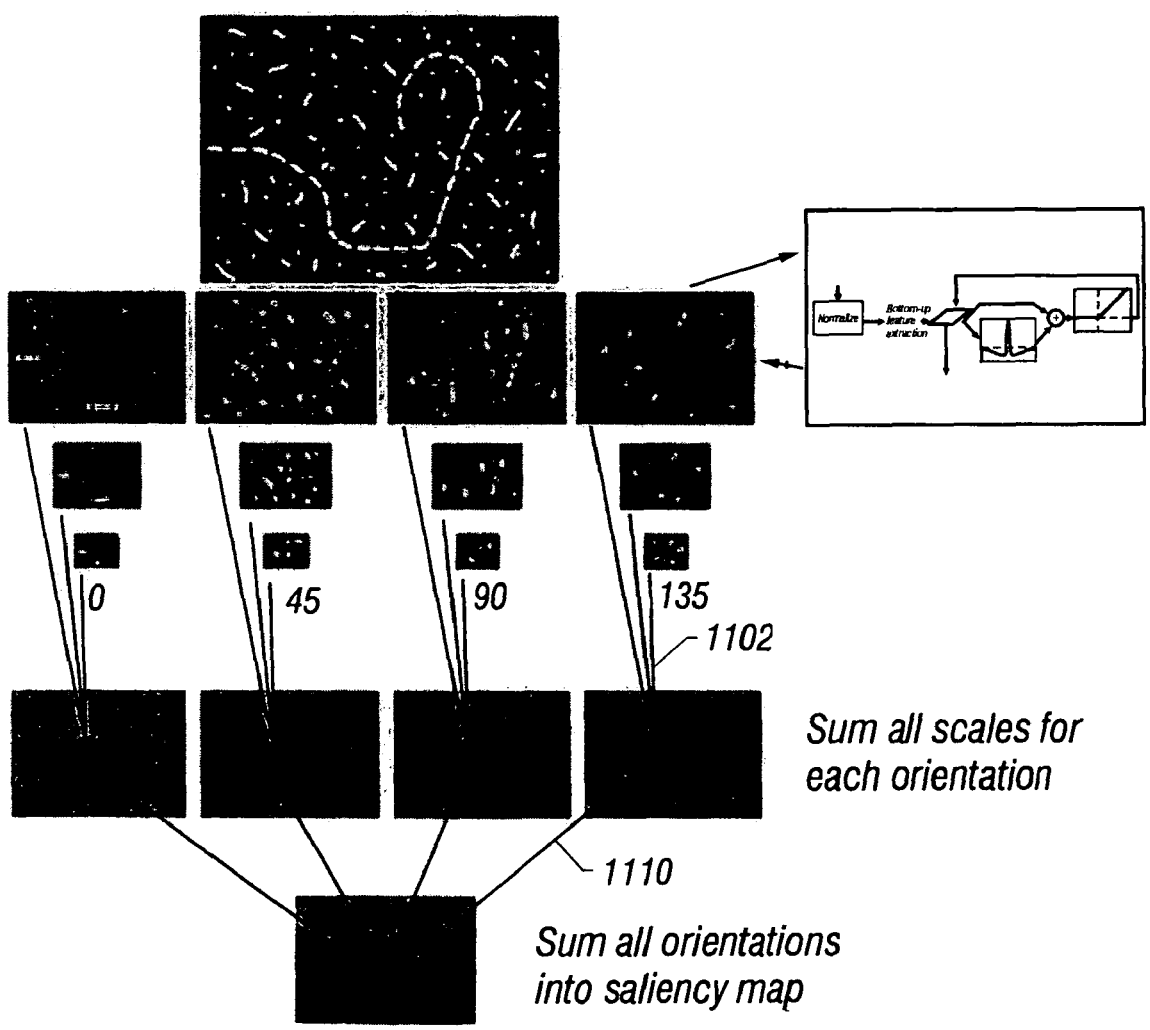
FIG. 11 shows some notion of the different image contour operations.

FIG. 10A shows parameters defining the field of influence between two nearby visual neurons, as found in typical single-spatial scale models of contour integration. The actual image 1000 is filtered by banks of orientation-selective filters 1010. These filters may approximate neuronal responses for several orientations and at several spatial scales 1020, not taking into account any interaction. FIG. 10B shows characterizing interactions between distant filters according to separating distance and angles. In typical models, this may yield a "field of influence" which defines the location, preferred orientation and connection strength between a central neuron of interest and its neighbors. FIG. 10C shows this field of influence Results obtained with this technique for each map M are then combined at 960, first across spatial scales for one orientation, and then across orientations as shown in FIG. 11.

Local oriented features are first extracted at multiple spatial scales and for multiple orientations (here four orientations at 0, 45, 90 and 135 degrees). The iterative competition for salience and contour integration process described in the previous figure is then applied to each resulting feature map (here represented only for one map, at the right).

The result is a single saliency map which contains not only small, localized salient objects as detected with the basic technique described with reference to FIGS. 1A and 1B, but also extended contours if those are salient.

Figure 12:
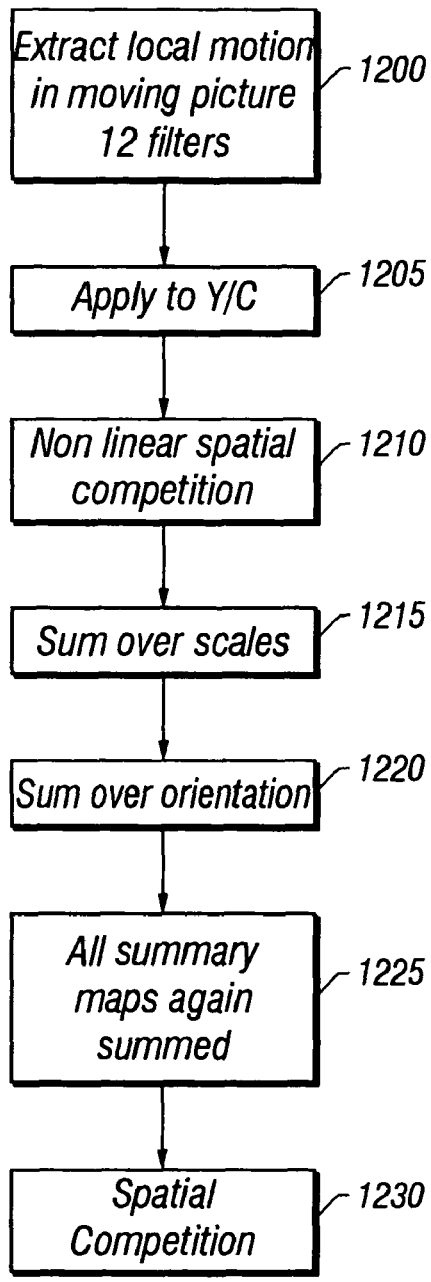
FIG. 12 shows a flowchart of motion in an extended image sequence.

The above has described operation with static images. An important extension of the above operates to provide a new feature channel for detection of salience in moving images in a video sequence. The operation may use the flowchart shown in FIG. 12.

At 1200, visual motion from a sequence of images (acquired, for instance, via a video camera) is extracted. This may use the Spatio Temporal Energy model that has previously been described by Adelson and Bergen. However, many other motion algorithms could also be used here. Briefly, this may apply three-dimensional (x,y,t) band-pass filters to the sequence of frames. Each filter detects motion in a given direction and at a given speed. Note that this filter is a type of orientation filter but in space-time instead of in two-dimensional spatial plane. A bank of such filters are provided and are tuned to motion in different directions such as up, down and left and right, and at different velocities, i.e., x pixels per frame. If we assume 4 directions, and three speeds, then 12 filters per image location are required.

At 1205, this motion extraction module is applied to the luminance (Y) and chrominance (C) channels of the image at several spatial scales, yielding one "motion map" for each orientation, velocity and scale.

1210 carries out non-linear spatial competition for salience, as described previously, with respect to each resulting motion map. That is, the motion saliency of multiple objects, moving roughly in the same direction and speed, is evaluated by the competitive and iterative process described above. Again, this step is crucial for evaluating the saliency of more than one object that moves in a similar direction and speed.

At 1215, all the maps for a given orientation and velocity (and several spatial scales) are summed into one summary map for that orientation and velocity.

At 1220, all those maps are then summed using the non-linear spatial competition process, and then at 1225, all the summary maps are summed. The final result of the non-linear spatial competition process is obtained at 1230.

This system is used for detecting saliency in the motion channel. A nonlinear within-feature competition scheme is used to detect motion in luminance and also in chrominance in a multiscale manner. This provides one motion map for each of orientation, velocity and scale for each of luminance and chrominance.

The nonlinear spatial competition system then is used for each resulting motion map.

Another embodiment recognizes that the Aaelson-Bergen or spatio-temporal image filters are specialized to pick up motion. Classic motion detectors do not respond to flicker in the image since nothing is moving in any direction. Hence, an additional filter may be added which provides a temporal derivative channel to pick up the flicker. Hence, this embodiment looks at flicker in animated sequences. This may be of particular relevance for evaluating the saliency of web-pages or marquette advertising or electronic displays with flashing LEDs.

Figure 13:
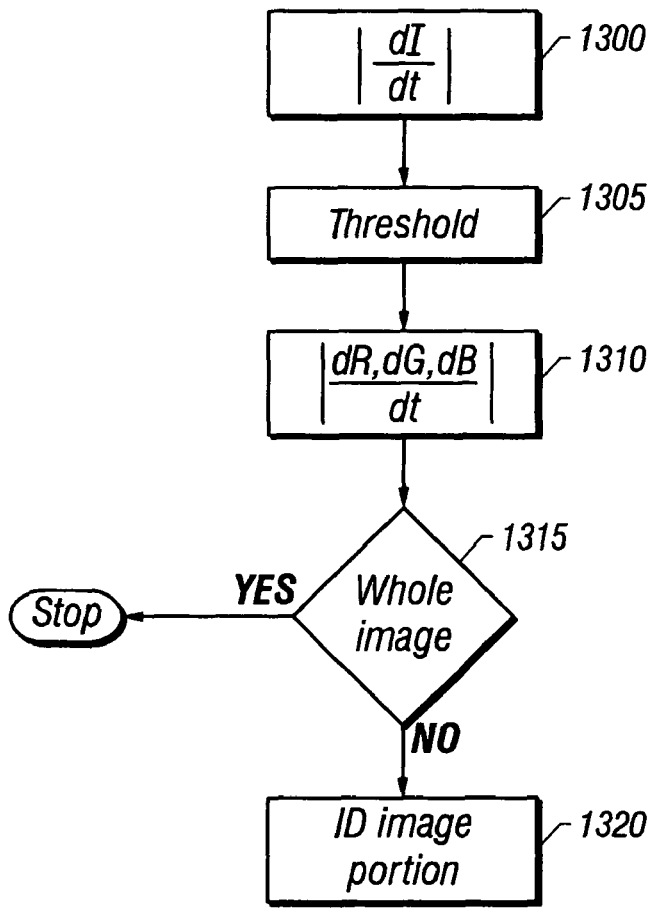
FIG. 13 shows a flowchart of thresholding.

Take an example of a light turning on and off, without moving, just flashing. This most certainly attracts attention. Yet Adelson-Bergen motion detectors do not respond to flicker, since nothing is moving in any one particular direction. A temporal derivative channel may be used to pick up flicker and integrate the derivative into saliency. An embodiment is shown in the flowchart of FIG. 13.

At 1300, the absolute value of the temporal derivative of the image intensity in computed. Since an increase in light should be as salient as a decrease in light intensity, any changes in this value, whether positive or negative, are relevant At 1305, this absolute difference value is thresholded, and compared against the threshold. That is, if the change in image intensity is too small, it is not considered, since it might be produced by noise. Other temporal information may be calculated at 1310, such as taking the derivative of colors, e.g. the red-green or blue-yellow color channels, with respect to time. Again, the absolute value of the temporal derivative in the red-green and in the blue-yellow color channels can be considered. At 1315, a test is made to determine if the change is over the whole image. If so, then the process stops. This is based on the recognition that flickering of the entire image may not be very salient. For example, simply turning room lights quickly on and off might not be very salient. This can be carried out using spatial competitive interactions as in the other channels. At 1320, the image portion that flickers is identified as salient, or increased in salience according to results of the iterative competition process applied to the flicker map.

A preferred embodiment for a flicker saliency channel hence may include:
- a basic rectified flicker extraction module based on taking the absolute value of the difference between two successive frames.
- its application to several spatial scales and in several image modalities (luminance, chrominance, etc).
- the application of a non-linear spatial competition for salience mechanism within each resulting flicker map.
- the summation of all the maps for a given modality (and several scales) into one summary map for that modality.
- the application on those summary maps of the non-linear spatial competition process
- the summation of all summary maps
- the application on the final result of the non-linear spatial competition process.

The above system evaluates saliency based on images obtained using a classical red-green-blue representation. This gives rise to two opponency channels (red-green and blue-yellow), an intensity channels, and four orientation channels. These seven channels are processed in separate computational streams. This can be extended to many more channels. Such multi-spectral or hyper-spectral image sensors may include near and far infra-red cameras, visible light cameras, synthetic aperture radar and so on. With images comprising large numbers of spectral bands, e.g., up to hundreds of channels in some futuristic military scenarios, significant redundancies will exist across different spectral bands. The saliency system can therefore be used to model more sophisticated interactions between spectral channels.

This may be achieved by implementing connections across channels whereby each feature map at a given scale can receive multiplicative excitatory or inhibitory input from another feature map at the same or different spatial scale. These connections extend the interactive spatial competition for salience already implemented in the saliency model: at each time step, spatial interactions within each map may be iterated, followed by one iteration of interactions across maps. Supervised training algorithms can be applied to include training of the weights by which the different channels interact. The resulting system may be able to exploit multi-spectral imagery in a much more sophisticated manner than is currently possible.

The above has described different ways of carrying out detection of the image saliency. The importance is that when exposure to an image or a sequence of images is short, attention of the (casual) observer is primarily deployed autonomously onto the locations which are most perceptually salient. A close approximation to the perceptual salience at every visual location allows a designer to optimize their work for notice by users. One application of such detection is in the field of advertising. It has been noted by the inventors that users do not perceive all components of a visual environment to be equally interesting. This may be used to evaluate the effectiveness of an advertising model. Hence, the embodiment is described which uses a computer to provide an automatic, objective, and quantitative tool by which the impact of advertising designs can be tested. This may be used on any image, moving or static, including, for example, web pages, billboards, magazine covers, TV commercials, or any medium to which the target audience may be briefly exposed.

This may be used to calculate saliency/conspicuity of items which are being displayed, for example, in an advertising context. This may include advertisements, visual art and text in print (magazines, news-papers, journals, books); posters, bill-boards and other outside, environmental displays; advertisements, visual art and text in electronic format on the world-wide-web or on computers; as well as the saliency/conspicuity of dynamic advertisements, visual art and clips in movies, TV film, videos, dynamic display boards or graphical user interfaces. It may also be used for the saliency/conspicuity of displays of products placed in shop windows, department stores, aisles and shelves, printed ads and so on for product placement. That is, given a particular product (e.g. a soda brand, wine bottle, candy bar), the software evaluates its saliency within the entire display by taking account of the entire view as would be seen by a casual observer or shopper.

The software can also determine how to change the visual appearance of the product, including its shape and its label, in order to increase its saliency. It can do so by providing specific information to the user on which features, at which spatial scales, are more or less salient than the object or location that the user wishes to draw the attention of the viewer to. For instance, say the user wishes to draw the eye of the viewer to a specific brand of candy bars in an array of candy bars, chocolates and other sweets. By inspecting the conspicuity maps for color, orientation and intensity (see FIG. 1), the user can get a first impression of which objects in the scene are salient because of an intensity difference, because of a color difference or because of their spatial orientation relative to the background. Further information can be provided by having the user inspect the entire pyramid for the different color and orientation maps. Now the user can discover at what particular spatial scale any one object or location in the image is most salient. This can then guide how the user should rearrange the candy display (or the ad) in order to maximize the desired object's saliency.

The above techniques have taught multiple ways of determining which part of the many maps representing the image has a maximum salience. This can be done from features, feature dimensions, and evaluation of the features at multiple spatial scales. The techniques of increasing the salience effectively uses a search process through parameter space. For example, each parameter may be varied in each direction to determine if that part of the image becomes more salient or less salient. A part of the image, for example, could be made a little redder. Once doing so, an evaluation of whether the saliency increases is made. If the saliency does increase from that change, then the image can be made redder still. This can be continued until the maximum saliency from that parameter is obtained. By carrying out a search process through parameter space, different parts of the image can be made more or less salient. The search process can be carried out through feature channels including any of the feature channels noted above, and through different scales. The parameter is changed systematically throughout each of these values to determine the effect on saliency, allowing the saliency of different parts of the image to be manipulated.

An additional aspect learns from the way in which images are made more salient. From this "experience", the system may use a conventional learning system to write rules which say, in a certain kind of the image/background/space, do a certain operation in order to increase the salience of the image portion. This automated system hence provides rules or preferences which can increase the salience.

Applications within the military, intelligence and security community which require (semi)-automatic evaluation of salient images to detect construction activities, evidence for burials, missile tests, intruders alert or the detection of humans in surveillance applications who behave "conspicuously" are also envisioned. In particular, this application may include multi-spectral images (where not only three color channels but possibly hundreds of different spectral images are combined in a similar manner to yield saliency) as well as moving imagery.

For applications in the robotic domain, the software can alert (semi)-autonomously moving robotic device of salient locations in the environment that need to be further inspected by a high-resolution sensory system or by a human observer.

This model may predict were casual observers will place their attention. For example, this could either be done as a service, where ad people send their ad to the service, and the service analyzes it and sends it back with an analysis of its saliency. Another paradigm is a web-based service where people submit images and the software automatically determines the first, second, third etc. most salient locations. The paradigm can also be carried out on a computer such as a PDA with attached camera. The software runs on this hand-held device as a sort of "saliency meter" for determining the saliency of, for example, a product display.

Other embodiments are within the disclosed invention.

What is claimed is:

1. A method, comprising:
   using a computer or processor to transform an image representation into a two dimensional spatial map to predict which parts in said image may be perceived as visually conspicuous by a human observer, and
   processing, by using a computer or processor, said predicted visually conspicuous parts to change visual appearance of objects or locations in said image to improve conspicuity or saliency of the objects or locations in the image.

2. A method as in claim 1 wherein said parts may attract the visual attention of said observer.

3. A method as in claim 1, wherein said parts may attract the eye gaze of said human observer.

4. A method as in claim 1, wherein said image representation may be a digital capture of some portion of the real world.

5. A method as in claim 1, wherein said perceived is by an animal observer.

6. A method as in claim 1, wherein said perceived is by a robotic device.

7. A method as in claim 1, wherein said transforming comprises analyzing pixels of said image using mean pixel values.

8. A method as in claim 1, wherein said transforming comprises analyzing pixels of said image using higher order statistical variations.

9. A method as in claim 1, wherein said image representation includes a single image at a single time.

10. A method as in claim 1, wherein said image representation includes a sequence of images over time.

11. A method as in claim 1, wherein said using comprises evaluating an effectiveness of said image in an advertising context.

12. A method as in claim 1, wherein said using comprises evaluating a display showing one or more items for sale.

13. A method as in claim 1, wherein said transforming comprises obtaining information about the image in at least a first spectral range and a second spectral range that is a different spectral range than said first spectral range; and correlating said information about the image in said first spectral range to information in said second spectral range.

14. A method as in claim 1, further comprising using said transforming to optimize a display of visual information.

15. A method as in claim 1, wherein said processing changes visual appearance of objects or locations in said image while maintaining visual appearance of parts of said image not associated with said objects or locations.

16. A method as in claim 1, wherein the change to visual appearance of objects or locations in said image changes a part of said image but not the entirety of said image.

17. A method, comprising:

using a computer or processor to transform an image representation into a spatial map to predict which parts in said image may be perceived as visually conspicuous by a human observer; and processing, by using a computer or processor, said predicted visually conspicuous parts to determine effectiveness of said image in displaying its contents, wherein the transforming comprises:

obtaining information about the image in at least a first spectral range and a second spectral range that is a different spectral range than said first spectral range; and correlating said information about the image in said first spectral range to information in said second spectral range.

18. A method, comprising:

using a computer or processor to transform an image representation into a two dimensional spatial map to predict which parts in said image may be perceived as visually conspicuous by a human observer, wherein said predicted visually conspicuous parts comprises at least a first set of visually conspicuous parts and a second set of visually conspicuous parts, and processing, by using a computer or processor, said predicted visually conspicuous parts to change visual appearance of objects or locations in said image to improve conspicuity or saliency of the objects or locations in the image, wherein the processing changes visual appearance of visually conspicuous parts in the first set of visually conspicuous parts differently from how the processing changes visual appearance of visually conspicuous parts in the second set of visually conspicuous parts.

19. A method as in claim 18, wherein the change to each of the predicted visually conspicuous parts comprise at least one of change to texture, shape, spatial scale, color, orientation, and intensity.

* * * * *

UNITED STATES PATENT AND TRADEMARK OFFICE
CERTIFICATE OF CORRECTION

PATENT NO. : 8,098,886 B2
APPLICATION NO. : 11/430684
DATED : January 17, 2012
INVENTOR(S) : Christof Koch and Laurent Itti It is certified that error appears in the above-identified patent and that said Letters Patent is hereby corrected as shown below:

In column 1, lines 18-19, the following wording should appear:

STATEMENT AS TO FEDERALLY-SPONSORED RESEARCH

This invention was made with government support under Grant No. N00014-95-1-0600 awarded by Office of Naval Research and Grant No. EEC-9402726 awarded by the National Science Foundation. The government has certain rights in the invention.

Signed and Sealed this
Twenty-seventh Day of March, 2012

David J. Kappos
*Director of the United States Patent and Trademark Office*